United States Patent [19]
Kamata et al.

[11] Patent Number: 5,503,494
[45] Date of Patent: Apr. 2, 1996

[54] SPLINE-COUPLING STRUCTURE

[75] Inventors: Akira Kamata; Hiroshi Moriya; Yuzi Ikki; Takeshi Hanamoto; Yoshiari Takagi, all of Wako; Hideo Otsuka, Haga, all of Japan

[73] Assignee: Honda Giken Kogyo Kabushiki Kaisha, Tokyo, Japan

[21] Appl. No.: 278,218

[22] Filed: Jul. 21, 1994

[30] Foreign Application Priority Data

| Jul. 22, 1993 | [JP] | Japan | 5-181053 |
| May 25, 1994 | [JP] | Japan | 6-110923 |

[51] Int. Cl.$^6$ ........................................ F16D 1/06
[52] U.S. Cl. ........................................ 403/359
[58] Field of Search ................... 403/359, 298, 403/345

[56] References Cited

U.S. PATENT DOCUMENTS

| 2,869,907 | 1/1959 | Deliso | 403/359 |
| 2,926,034 | 2/1960 | Weaver | 403/359 X |
| 3,179,450 | 4/1965 | Recker | 403/359 X |
| 3,260,541 | 7/1966 | Sadler et al. | 403/359 X |
| 3,335,580 | 8/1967 | Simpson, Jr. | 403/359 X |
| 3,865,500 | 2/1975 | Newell | 403/359 |
| 4,115,022 | 9/1978 | Orain | 403/359 |
| 4,437,782 | 3/1984 | Geisthoff | 403/359 X |
| 4,552,544 | 11/1985 | Beckman et al. | 403/359 X |
| 4,875,796 | 10/1989 | Storm | 403/359 |
| 5,149,223 | 9/1992 | Watts | 403/359 |

FOREIGN PATENT DOCUMENTS

| 2739686 | 3/1978 | Germany | 403/359 |
| 211019 | 12/1983 | Japan | 403/359 |
| 1279120 | 11/1989 | Japan | 403/359 |

Primary Examiner—Randolph A. Reese
Assistant Examiner—Christopher J. Novosad
Attorney, Agent, or Firm—Armstrong, Westerman, Hattori, McLeland & Naughton

[57] ABSTRACT

A spline-coupling structure in which at least one of male and female members has a press-fit guide face provided at its end opposed to the other member before press-fitting of the members. The press-fit guide face includes a plurality of guide face portions smoothly interconnecting the end and bottom lands of the spline teeth of the one member to form axially outwardly expanded arcs, a plurality of second guide face portions smoothly interconnecting tooth addendums of the spline teeth and the end to form axially outwardly expanded arcs, and a plurality of third guide face portions smoothly interconnecting tooth flanks of the spline teeth and the second guide face portion to form axially outwardly expanded arcs. The first, second and third guide face portions are connected smoothly to one another. Thus, dragging between the spline teeth of both members is prevented during press-fit coupling, to maximize the function of crownings to reduce press-fitting load and provide a sufficient coupling force, and facilitate disengagement of both members from each other and allow reuse of both members.

2 Claims, 8 Drawing Sheets

SPLINE-COUPLING STRUCTURE

BACKGROUND OF THE INVENTION

1. Field of the Invention

The present invention relates to a spline-coupling structure comprising a male member having a set of spline teeth provided on an outer periphery thereof and a female member having another set of spline teeth provided on an inner periphery thereof. At least one of the sets of spline teeth have crownings thereon. The sets of spline teeth are coupled with each other by press-fitting the members, with each other, along an axial direction thereof.

2. Description of the Related Art

Such structure is already known from Japanese Utility Model Application laid-open No. 97655/87 and Japanese Utility Model Application laid-open No. 5515/92.

In the prior art structures, crownings are provided on at least one of the two sets of spline teeth on the members, thereby facilitating the mutual press-fitting of the members and providing a sufficient coupling force upon the completion of the press-fitting. However, an end face of each of the members is connected with tooth flanks, bottom lands and tooth crests of the spline teeth to form acute angle portions by one another. For this reason, when the members are press-fitted, one into another, the following disadvantages are encountered, due to a damaging attendant on a dragging produced at the angle portions, irrespective of the crownings being provided: The press-fitting load is increased; actually press-fit coupled areas of the spline teeth are reduced, whereby a sufficient coupling force fails to be provided; and a lubricating oil passage is clogged with residues produced due to the dragging. In addition, although the crownings are intended to facilitate the disengagement of both the members from each other and, hence, enable reuse of, both members if there is no damage thereto, however, it is difficult, not only to conduct the disengagement of the members from each other, but also to reuse such members when the dragging damages the members.

SUMMARY OF THE INVENTION

Accordingly, it is an object of the present invention to provide a spline coupling structure, wherein dragging is prevented from being produced during press-fit coupling of such members, one into another, thereby preventing the above-described disadvantages.

To achieve the above object, according to the present invention, there is provided a spline-coupling structure comprising a male member having a set of spline teeth provided on an outer periphery thereof and a female member having another set of spline teeth provided on an inner periphery thereof, at least one of the two sets of the spline teeth having crownings thereon, and the two sets of the spline teeth are coupled with each other by press-fitting of both the members with each other along axial directions thereof, wherein at least one of the male and female members has a press-fit guide face provided at its end which is opposed to the other member before press-fitting of the members, the press-fit guide face being comprised of a plurality of first guide face portions, smoothly interconnecting an end face and bottom lands of the spline teeth of the one member to form axially outwardly expanded arcs, a plurality of second guide face portions smoothly interconnecting tooth crests of the spline teeth and the end face to form axially outwardly expanded arcs, and a plurality of third guide face portions smoothly interconnecting tooth flanks of the spline teeth and the second guide face portions to form axially outwardly expanded arcs, the first, second and third guide face portions being connected smoothly to one another.

It is another object of the present invention to provide a spline coupling structure, wherein a working device of a reduced size can be used to facilitate the working of the guide face and, after centering of the male spline teeth, the tooth crests of the male spline teeth can be press-fitted to the bottom lands of the female spline teeth, whereby dragging by an edge portion is reliably prevented to allow a smooth press-fitting and to provide sufficient coupling force.

To achieve the above object, according to the present invention, the male spline teeth on the male member are provided with crownings each having, on opposite sides of its longitudinal central portion, tooth flank press-fit portions which are press-fitted to tooth flanks of the female spline teeth on the female member. The female member is provided with the mentioned press-fit guide face, and a press-fit starting position, for starting the press-fitting of the tooth crests of the male spline teeth to the bottom lands of the female spline teeth, is established at a location substantially corresponding to a first press-fit starting position at which the tooth flank press-fit portions of the male spline teeth are started to be press-fitted to the tooth flanks of the female spline teeth in a direction of press-fitting of the male member into the female member, or a location displaced forwardly along the press-fitting direction from the first press-fit starting position.

The above and other objects, features and advantages of the invention will become apparent from the following description of a preferred embodiment taken in conjunction with the accompanying drawings.

BRIEF DESCRIPTION OF THE DRAWINGS

FIGS. 1 to 9 illustrate a preferred embodiment of the present invention, wherein FIG. 1 is a perspective exploded view of male and female members shown before spline-coupling;

FIG. 2 is an enlarged view of a portion indicated by circle 2 in FIG. 1;

FIG. 3 is an enlarged longitudinally sectional view of the members before spline-coupling;

FIG. 4 is a sectional view taken along line 4—4 in FIG. 3;

FIG. 5 is a sectional view taken along line 5—5 in FIG. 3;

FIG. 6 is a sectional view taken along line 6—6 in FIG. 3;

FIG. 7 is a plan view of a spline tooth having crownings;

FIG. 8 is a sectional view taken along line 8—8 in FIG. 7;

DETAILED DESCRIPTION OF THE PREFERRED EMBODIMENT

The present invention will now be described by way of a preferred embodiment in connection with the accompanying drawings.

Figure 1:
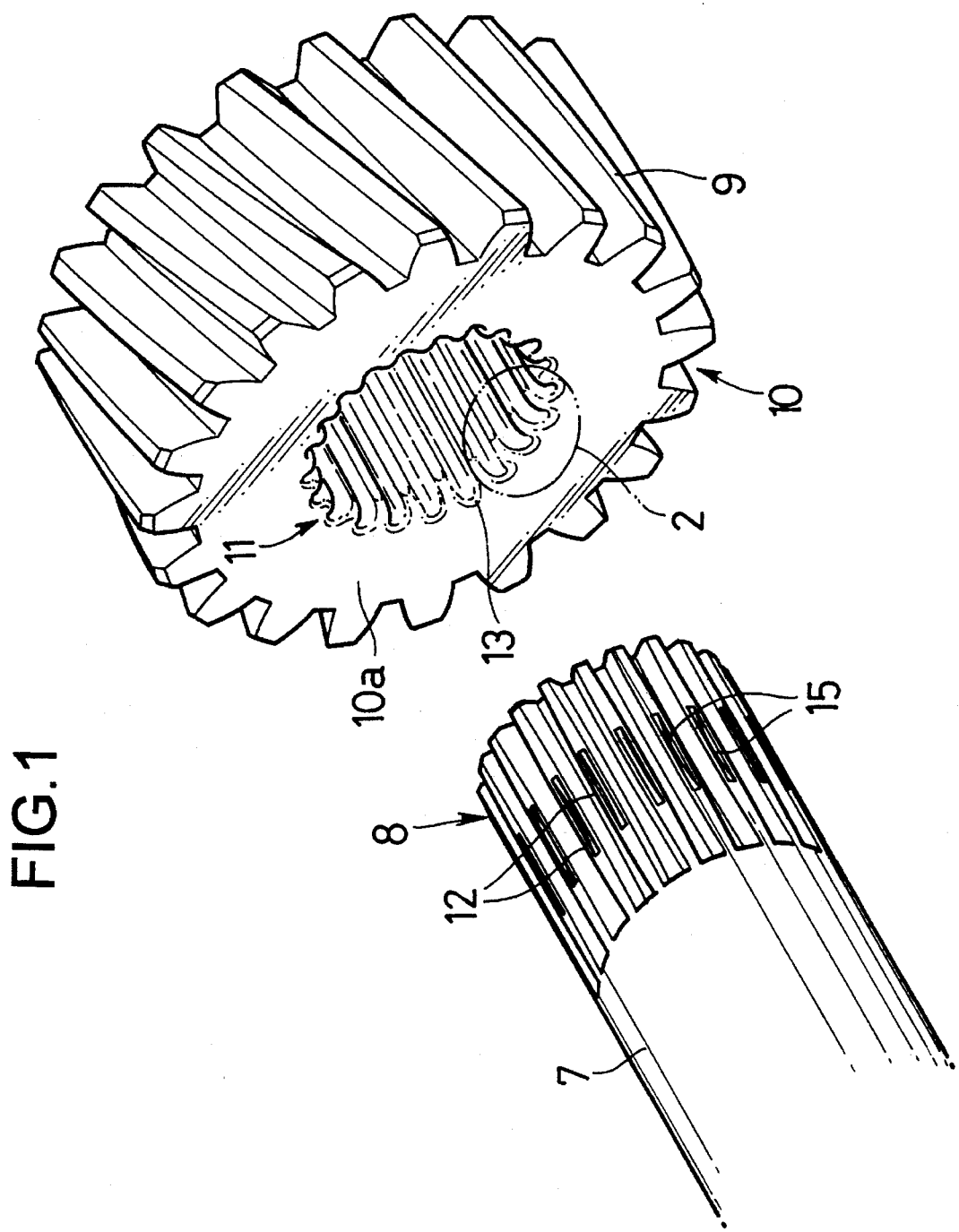
Figure 2:
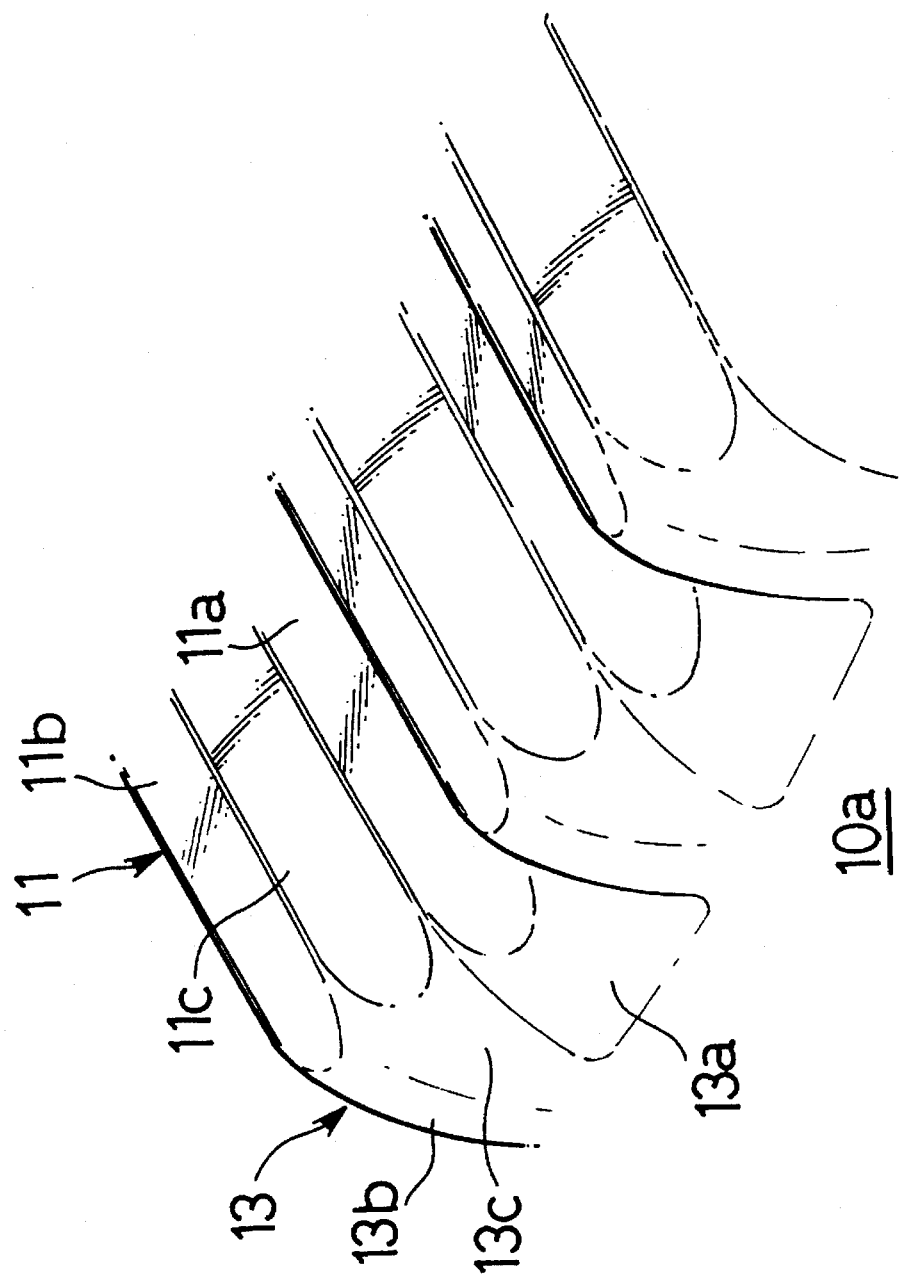
Figure 3:
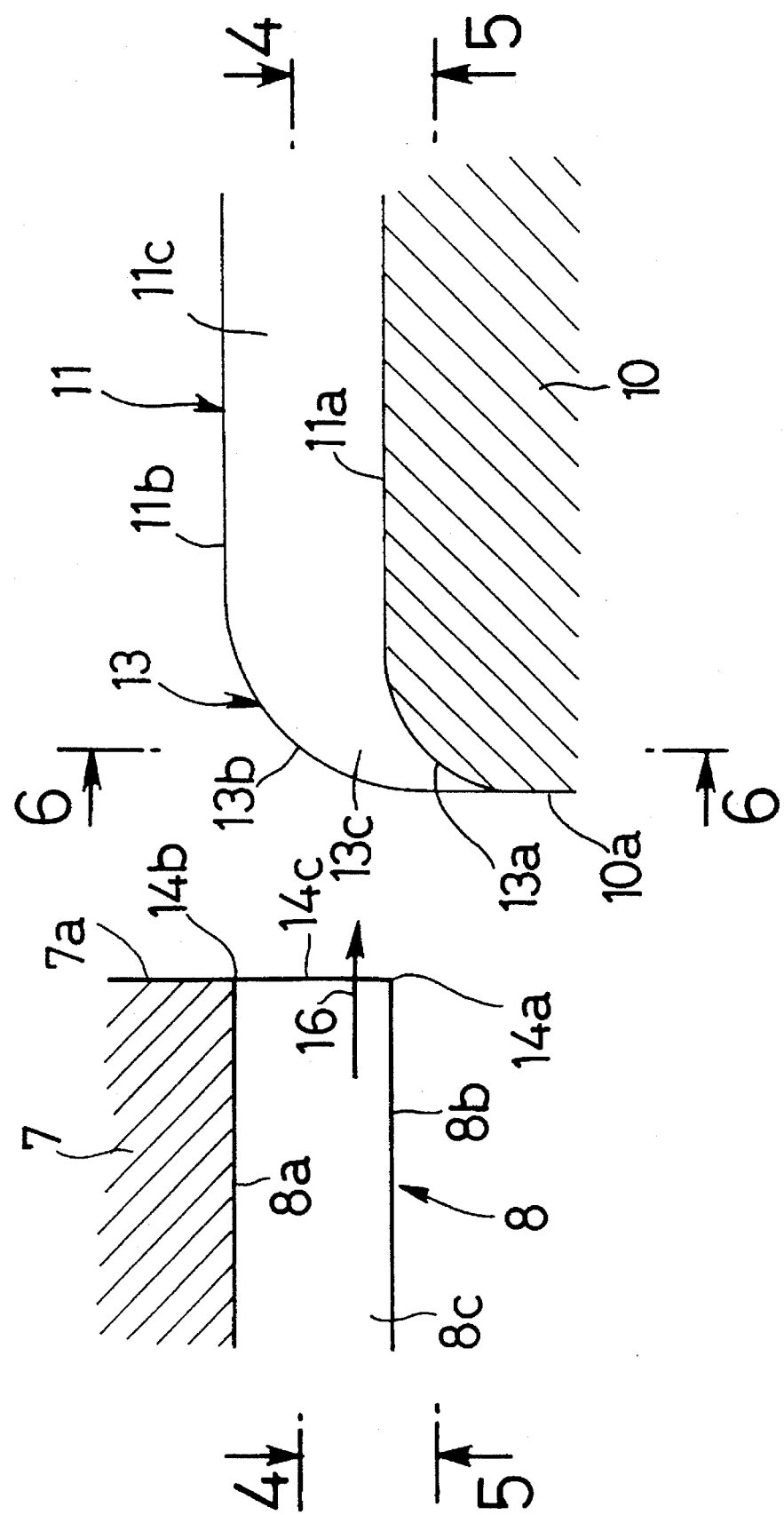

Referring first to FIG. 1, male spline teeth 8 are provided on an outer periphery of an end of shaft 7, a male member. Female spline teeth 11 are provided on an inner periphery of a gear 10, a female member. The gear 10 is formed into a ring-like configuration to have, for example, helical teeth 9 on an outer periphery thereof. Shaft 7 and gear 10 are coupled to each other by meshing of the male and female teeth 8 and 11 with each other by mutual axial press-fitting along an axial direction of the shaft and gear. In order to facilitate such press-fitting and to provide sufficient coupling force upon the completion of the press-fitting, crownings 12 are provided on at least one of the spline teeth 8 and 11, in the illustrated embodiment, the male spline teeth 8.

A press-fit guide face 13, according to the present invention, is provided on at least one of the shaft 7 and the gear 10, particularly on one of them provided with teeth having higher hardness, if the spline teeth 8 and teeth 11 of gear 10 have different hardness. In many cases, the shaft 7 is subjected to different workings or thermal treatments depending upon portions, such as, the male spline teeth 8. This includes a case where threads are provided on the shaft 7 in the vicinity of the male spline teeth 8. Therefore, even if the shaft 7 and the gear 10 are formed from the same material, the hardness of the male spline teeth 8 may be reduced, to a lower level than the hardness of the female spline teeth 11 because of the thermal treatment. Thereupon, when the hardness of the female spline teeth 11 is higher than that of the male spline teeth 8, the press-fit guide face 13 is provided at least on the gear 10 at an end thereof which is opposed to the shaft 7 prior to the press-fitting of the shaft 7 and the gear 10 with each other. The shaft 7, as the male member, has a large axial length, and a device for forming such press-fit guide face at the end of such a long member must be large-sized. However, it is possible to facilitate the working and to provide a reduction in size of the working device by forming the press-fit face 13 on the female spline teeth 11 of gear 10.

Referring to FIGS. 2 to 6, the press-fit guide face 13 is comprised of a plurality of first guide face portions 13a, interconnecting an end face 10a of the gear 10 and bottom lands 11a of the female spline teeth 11, a plurality of second guide face portions 13b, interconnecting tooth addendums, or crests, 11b of the female spline teeth 11 and the end face 10a, and a plurality of third guide face portions 13c, interconnecting tooth flanks 11c, of the female spline teeth 11 and the second guide face portions 13b, the first, second and third guide face portions 13a, 13b and 13c, being smoothly connected to one another.

Each of the first guide face portions 13a is formed into an arcuate shape, with a longitudinal profile expanded axially outwardly, so as to smoothly interconnect the end face 10a and the bottom land 11a. Each of the second guide face portions 13b is formed into an arcuate shape, with its longitudinally sectional profile expanded axially outwardly, so as to smoothly interconnect the tooth crest 11b and the end face 10a. Further, each of the third guide face portions 13c is formed into an arcuate shape, with its longitudinally sectioned profile expanded axially outwardly, so as to smoothly interconnect the tooth flank 11c and corresponding one of the second guide face portions 13b.

The press-fit guide face 13 is formed by smoothly connecting the first guide face portions 13a, the second guide face portions 13b and the third guide face portions 13c with one another. Therefore, at the end of the gear 10, opposed to the shaft 7 prior to the coupling with the shaft 7, the end face 10a of the gear 10, the bottom lands 11a, the tooth addendums 11b and the tooth flanks 11c of the female spline teeth 11 are connected with one another by the press-fit guide face 13 having no acute angle.

In such press-fit guide face 13, the first guide portion 13a corresponds to a first edge 14a between each of tooth addendums 8b of the male spline teeth 8, provided on the shaft 7, and an end face 7a of the shaft 7; the second guide face portion 13b corresponds to a second edge 14b between each of bottom lands 8a of the male spline teeth 8 and the end face 7a; and the third guide face portion 13c corresponds to a third edge 14c between each of tooth flanks 8c of the male spline teeth 8 and the end face 7a.

Figure 7:
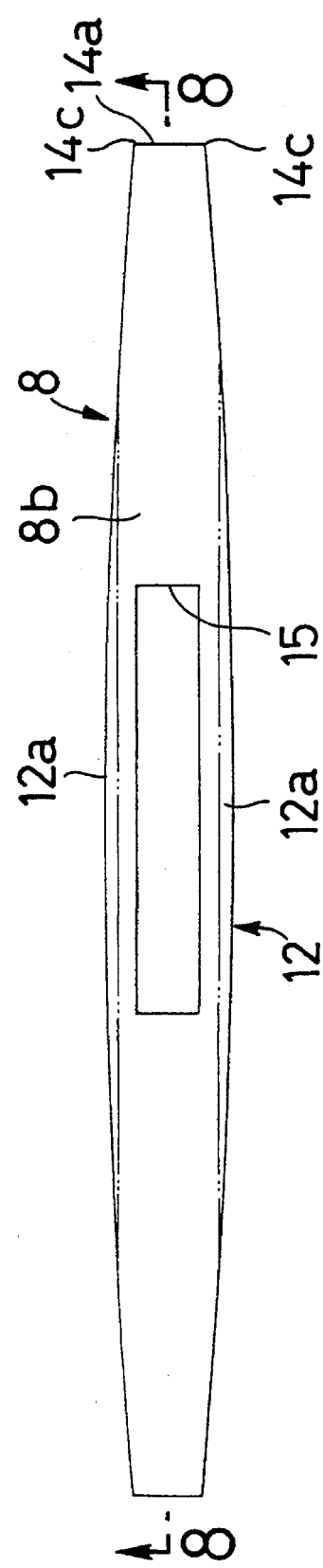
Figure 8:
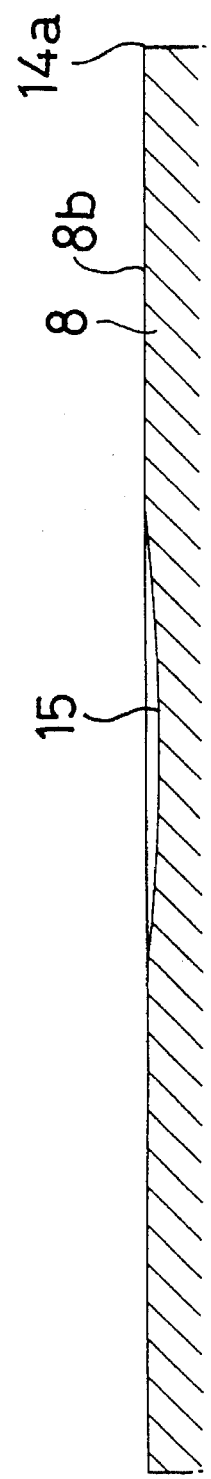

Referring to FIGS. 7 and 8, each of the crownings 12, provided on the male spline teeth 8 is provided, at its opposite sides of a longitudinally central portion thereof, with tooth flank press-fit portions 12a, 12a, shown by dashed lines in FIG. 7, which are press-fitted to the tooth flanks 11c of the female spline teeth 11 of the gear 10. Recesses 15 are provided at longitudinally central portions of the tooth addendums 8b of the male spline teeth 8, and serve to reduce the press-fitting load when the tooth addendums 8b of the male spline teeth 8 are press-fitted to the bottom lands of the female spline teeth 11, thereby allowing a more smooth press-fitting.

Figure 4:
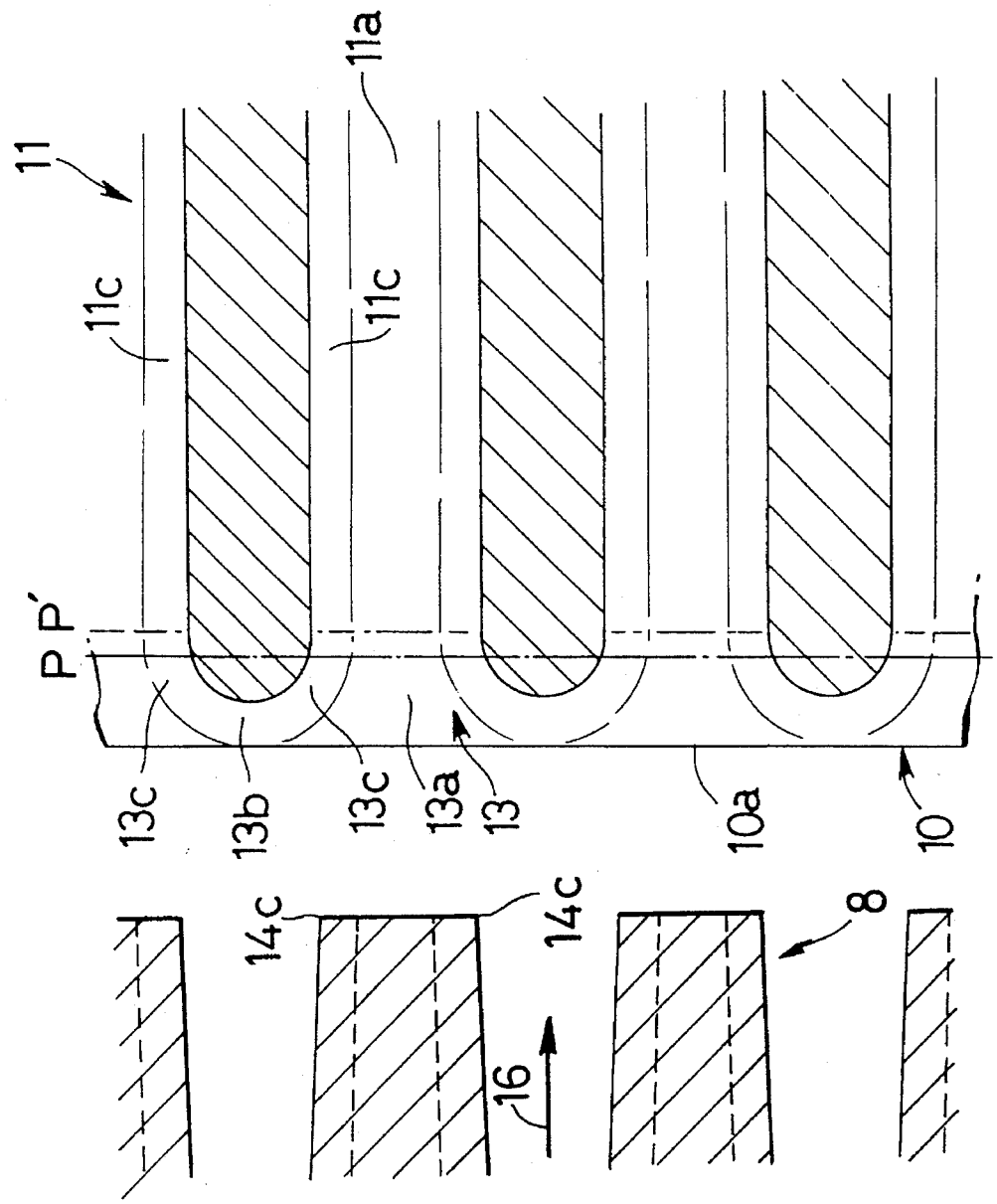
Figure 5:
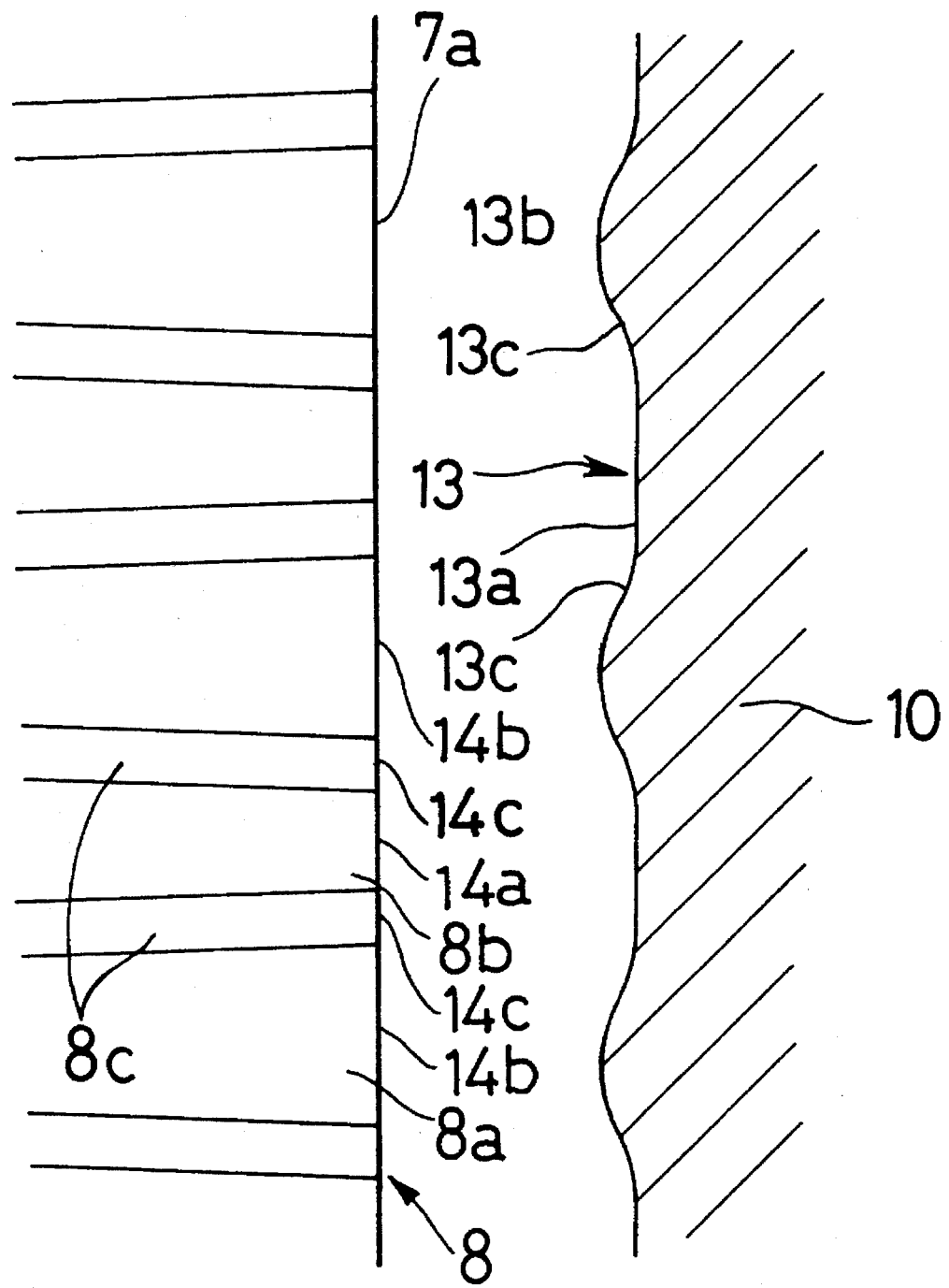
Figure 6:
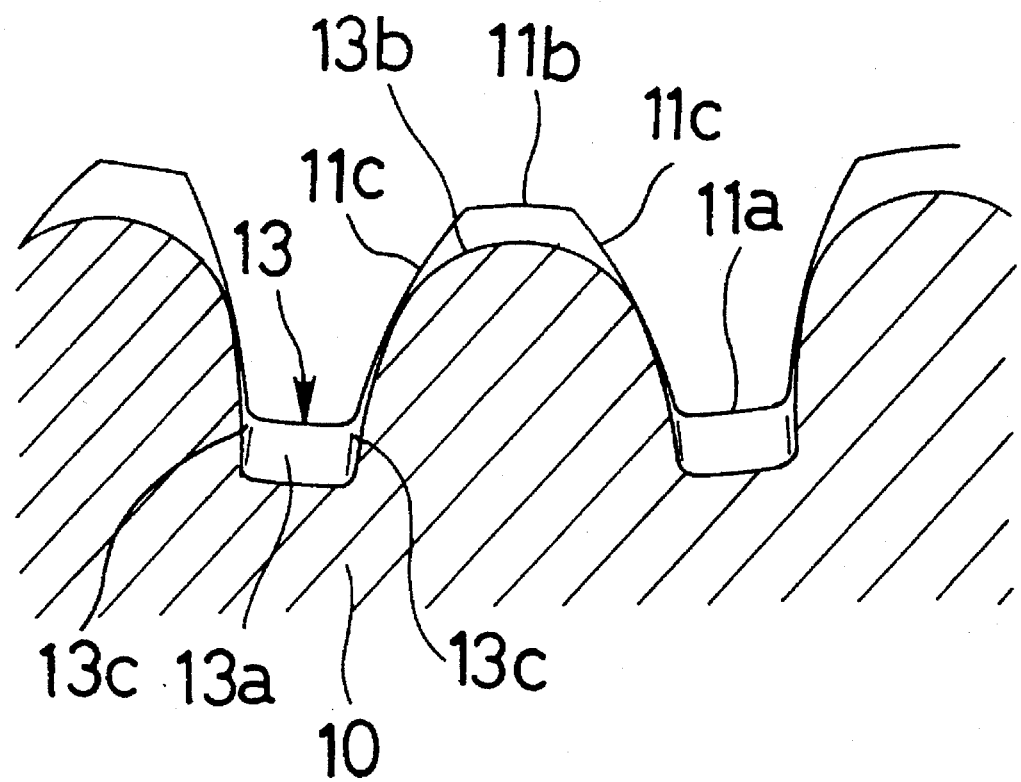

The tooth flank press-fit portions 12a, 12a of the crowning 12 are started to be press-fitted to the tooth flanks 11c, 11c of the female spline teeth 11 at a press-fit starting position P lying in the middle of the third guide face portions 13c, 13c of the press-fit guide face 13 of the gear 10, as shown in FIG. 4. The first guide face portion 13a of the press-fit guide face 13 is continuously extended from the bottom land 11a in the female spline teeth 11 at a position displaced forwardly from the press-fit starting position P in a direction of press-fitting 16 into the gear 10 of the shaft 7, e.g., at the substantially same position as the portion of the tooth flank 11c continuously extended from the third guide face portion 13c in this embodiment. Thus, the press-fit starting position, at which the tooth addendums 8b of the male spline teeth 8 are started to be press-fitted to the bottom lands 11a of the female spline teeth 11, is established at substantially the same location as the aforementioned press-fit starting position P.

Figure 9A:
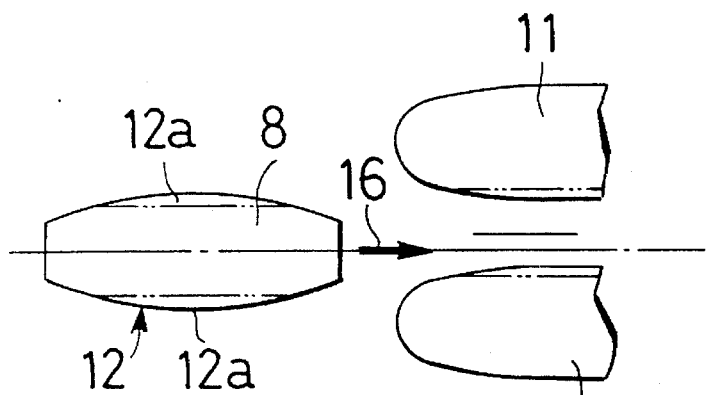
FIGS. 9A–9D are illustrations for explaining the press-fitting stages.
Figure 9B:
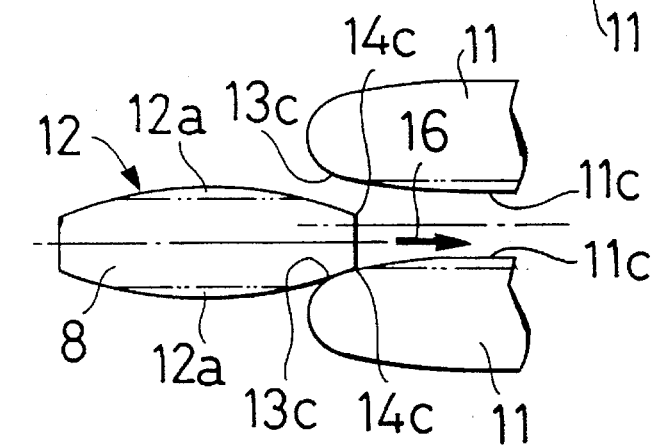
Figure 9C:
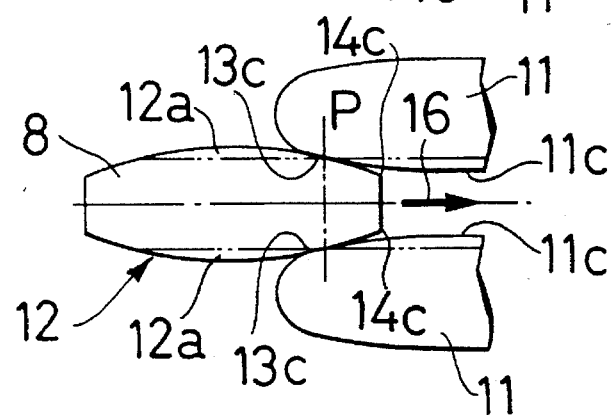
Figure 9D:
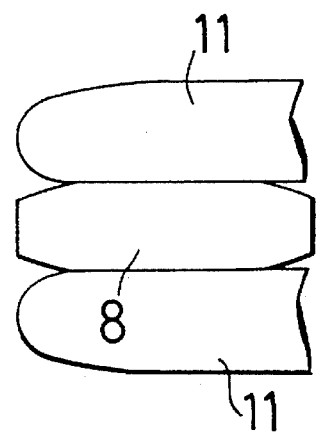

The operation of this embodiment will be described below with reference to FIG. 9. If the press-fitting of the male spline teeth 8 into the female spline teeth 11 is carried out with phases of the male spline teeth 8 and the female spline teeth 11 being misaligned from each other, as shown in FIG. 9(A), the third guide face portion 13c smoothly receives one of the third edges 14c, 14c in the male spline teeth 8 with no dragging, and the first and second guide face portions 13a and 13b, FIG. 3, smoothly receive the first and second edges 14a and 14b of the male spline teeth 8, respectively, as shown in FIG. 9(B). As the press-fitting in the press-fitting direction is advanced, the third guide face portions 13c, 13c of the female spline teeth 11 smoothly guide the third edges 14c, 14c to exhibit a centering effect, as shown in FIG. 9(C). When both the tooth flank press-fit portions 12a, 12a of the crowning 12 have reached the press-fit starting position P, the phases of the male and female spline teeth 8 and 11 are aligned with each other. If the press-fitting in the press-fitting direction is further advanced after the centering, the tooth flank press-fit portions 12a, 12a are press-fitted to the tooth flanks 11c, 11c, finally resulting in a condition as shown in FIG. 9(D). The press-fit starting position at which the tooth crest 8b in the male spline teeth 8 is started to be press-fitted to the bottom land 11a of the female spline teeth 11, is established at substantially the same location as the press-fit starting position P at which the tooth flank press-fit portions 12a, 12a are started to be press-fitted to the tooth flanks 11c, 11c of the female spline teeth 11. After completion of the centering, the press-fitting of the first edge 14a of the male spline teeth 8 to the bottom land 11a is started. Therefore, the press-fitting of the first edge 14a, FIG. 3, to the bottom land 11a cannot be started before the completion of the centering, thereby enabling a smooth fitting to provide a sufficient coupling force between the tooth flank press-fit portion 12a and the tooth flank 11c as well as between the tooth crest 8b and the bottom land 11a.

Because the press-fit guide face 13, having no acute angle portion, is provided between the end face 10a of the gear 10 and the female spline teeth 11 in the above manner, the male spline teeth 8 are smoothly guided by the press-fit guide face 13 and press-fitted into the female spline teeth 11 during press-fit coupling between the shaft 7 and gear 10, so that dragging is prevented between the male and female spline teeth 8 and 11, and damaging due to dragging is prevented. Thus, it is possible to exhibit an effect by the crownings 12, to the maximum, to reduce the press-fitting load and to provide a sufficient coupling force. In addition, no residue is produced due to the dragging and hence, a passage for lubricating oil is not clogged. Moreover, the prevention of the damaging due to the dragging ensures that disengagement of the shaft 7 and the gear 10 from each other can be facilitated by the crownings 12, and the shaft 7 and the gear 10 can be reused.

It is a common practice to supply lubricating oil between the spline teeth 8 and 11 during press-fit coupling. According to the present invention, because there is not an acute angle portion on the press-fit guide face 13, an oil film of the lubricating oil is not cut. Thus, the lubrication during press-fit coupling of the spline teeth 8 and 11 can satisfactorily be conducted up to the completion of the coupling, thereby further facilitating the press-fitting operation and effectively preventing dragging. If an acute angle chamfered-portion is provided between the female spline teeth 11 and the end face 10a, then it is difficult to conduct a sufficient lubrication, because the oil film is cut by the angle portion.

Further, because the press-fit guide face 13 is provided on the member provided with the spline teeth having a higher hardness, i.e., on the gear 10 in this embodiment, the biting of the teeth having the higher hardness into the teeth having a lower hardness is prevented, and dragging is prevented more effectively during the press-fit coupling.

Although the embodiment of the present invention has been described in detail, it will be understood that the present invention is not limited to the above-described embodiment, and various modifications may be made without departing from the spirit and scope of the invention defined in claims.

For example, a press-fit guide face may be provided on the member provided with the crownings. In this case, the press-fit guide face may be smoothly connected to the crownings. The press-fit starting position at which the tooth addendums 8b of the male spline teeth 8 are started to be press-fitted to the bottom lands of the female spline teeth 11 may be established in front, in the press-fitting direction, of the press-fit starting position at which the tooth flank press-fit portions 12a, 12a are started to be press-fitted to the tooth flanks 11c, 11c of the female spline teeth 11.

The terms and expressions which have been employed in the foregoing description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed is:

1. A spline-coupling structure comprising a male member having a set of spline teeth provided on an outer periphery thereof and a female member having another set of spline teeth provided on an inner periphery thereof, at least one of said two sets of spline teeth having crownings thereon, said two sets of the spline teeth being couplable with each other by press-fitting said members toward each other along axial directions of said members, wherein at least one of said male and female members has a press-fit guide face at an end of said one member which is opposed to an end of the other of said members before press-fit coupling of said members, said press-fit guide face including a plurality of first guide face portions smoothly interconnecting an end face and bottom lands of said spline teeth of said one member to form axially outwardly expanded arcs, a plurality of second guide face portions smoothly interconnecting tooth addendums of said spline teeth and said end face to form axially outwardly expanded arcs, and a plurality of third guide face portions smoothly interconnecting tooth flanks of said spline teeth and said second guide face portions to form axially outwardly expanded arcs, said first, second and third guide face portions being connected smoothly to one another without having an acute angle portion therebetween.

2. A spline-coupling structure according to claim 1, wherein said male spline teeth on said male member are provided with crownings each having, on opposite sides of its longitudinal central portion, tooth flank press-fit portions which are press-fitted to said tooth flanks of said spline teeth on said female member; said female member having said press-fit guide face, and a press-fit starting position for starting press-fitting of tooth addendums of said spline teeth of the male member to said bottom lands of said spline teeth of the female member is established at one of a location substantially corresponding to a first press-fit starting position at which said tooth flank press-fit portions of the male member are started to be press-fitted to said tooth flanks of said spline teeth of the female member in a direction of press-fitting of said male member into said female member, and a location displaced forwardly along said press-fitting direction from said first press-fit starting position.

\* \* \* \* \*